US009290699B2

(12) United States Patent  
Heraud et al.

(10) Patent No.: US 9,290,699 B2
(45) Date of Patent: Mar. 22, 2016

(54) PROCESS FOR SYNTHESIZING HYDROCARBONS FROM SYNTHESIS GAS WITH CONTROL OF THE TEMPERATURE OF THE EXTERNAL LOOP

(71) Applicants: IFP ENERGIES NOUVELLES, Rueil-Malmaison (FR); ENI S.P.A., Rome (IT)

(72) Inventors: Jean Philippe Heraud, Saint Pierre de Chandieu (FR); Jean Christophe Viguie, Lyons (FR); Sebastien Boucher, Chatou (FR); Chiara Della Torre, Milan (IT); Elsa Mignone, Monza (IT)

(73) Assignees: ENI S.P.A., Rome (IT); IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 14/408,621

(22) PCT Filed: Apr. 10, 2013

(86) PCT No.: PCT/FR2013/050774
§ 371 (c)(1),
(2) Date: Dec. 17, 2014

(87) PCT Pub. No.: WO2013/190191
PCT Pub. Date: Dec. 27, 2013

(65) Prior Publication Data
US 2015/0259608 A1    Sep. 17, 2015

(30) Foreign Application Priority Data

Jun. 18, 2012 (FR) ..................................... 12 01731

(51) Int. Cl.
*C07C 27/00* (2006.01)
(Continued)

(52) U.S. Cl.
CPC ................. *C10G 2/332* (2013.01); *B01J 8/001* (2013.01); *B01J 8/007* (2013.01); *B01J 8/228* (2013.01);
(Continued)

(58) Field of Classification Search
CPC .................................. C10G 2/32; C10G 2/342
USPC .................................................... 518/700, 715
See application file for complete search history.

(56) References Cited

U.S. PATENT DOCUMENTS 7,662,865 B2    2/2010    Marion et al.
(Continued)

FOREIGN PATENT DOCUMENTS

FR    2802828 A1    6/2001
(Continued)

OTHER PUBLICATIONS

Schweitzer et al., Apparatus and method for separating liquid products from a suspension arising from a Fischer-Tropsch, Fr 2328389, machine translation, Jun. 2001.*
International Search Report dated Jun. 4, 2013 issued in corresponding PCT/FR2013/050774 application (pp. 1-3).

*Primary Examiner* — Jafar Parsa
(74) *Attorney, Agent, or Firm* — Millen White Zelano and Branigan, PC; Csaba Henter; Anthony Zelano

(57) ABSTRACT

The present invention concerns a process for the synthesis of hydrocarbons from a feed comprising synthesis gas, in which a solid catalyst comprising cobalt is used in a three-phase reaction section operated such that said catalyst is maintained in suspension in a liquid phase by movement of a gas phase from the bottom to the top of said reaction section, said process comprising an external loop for separating waxes, characterized in that:
1) the theoretical ratio $P_{H2O}:P_{H2}$ in the external loop for separating waxes is determined using the following calculation:

$P_{H2O}:P_{H2}$ theoretical = $Cv/(R1-Rft \times Cv)$ where $Cv = (CO_{inlet} - CO_{degas})/CO_{inlet}$
$R1 = H_{2\,inlet}/CO_{inlet}$
$Rft = (H_{2\,inlet} - H_{2\,degas})/(CO_{inlet} - CO_{degas})$
2) if the theoretical ratio $P_{H2O}:P_{H2}$ determined in step 1) has a value of $R_{threshold}$ or higher, the temperature in the degassing means for the external loop for separating waxes is reduced,
3) steps 1) to 2) are repeated until the theoretical ratio $P_{H2O}:P_{H2}$ has a value strictly less than $R_{threshold}$, where $R_{threshold}$ is in the range 0.1 to 1.1.

14 Claims, 2 Drawing Sheets

(51) Int. Cl.
*C10G 2/00* (2006.01)
*B01J 23/75* (2006.01)
*B01J 8/22* (2006.01)
*B01J 8/00* (2006.01)
*B01D 21/02* (2006.01)

(52) U.S. Cl.
CPC ............... *B01J 23/75* (2013.01); *C10G 2/342* (2013.01); *B01D 21/02* (2013.01); *B01J 2208/003* (2013.01); *B01J 2208/00176* (2013.01); *B01J 2219/0024* (2013.01); *B01J 2219/00202* (2013.01); *B01J 2219/00207* (2013.01); *B01J 2219/00213* (2013.01); *B01J 2219/00238* (2013.01)

(56) References Cited

U.S. PATENT DOCUMENTS

| | | |
|---|---|---|
| 7,968,610 B2 | 6/2011 | Tasso et al. |
| 8,399,526 B2 | 3/2013 | Marion et al. |
| 2009/0176894 A1 | 7/2009 | Marion et al. |
| 2011/0009502 A1 | 1/2011 | Marion et al. |
| 2011/0039953 A1 | 2/2011 | Tasso et al. |

FOREIGN PATENT DOCUMENTS

| | | |
|---|---|---|
| FR | 2908421 A1 | 5/2008 |
| FR | 2926084 A1 | 7/2009 |
| WO | 2009/086924 A2 | 7/2009 |

\* cited by examiner

PROCESS FOR SYNTHESIZING HYDROCARBONS FROM SYNTHESIS GAS WITH CONTROL OF THE TEMPERATURE OF THE EXTERNAL LOOP

TECHNICAL FIELD OF THE INVENTION

The present invention relates to the field of the synthesis of hydrocarbons from a feed comprising carbon monoxide (CO), hydrogen ($H_2$) and possibly carbon dioxide ($CO_2$), hereinafter termed synthesis gas.

The process of the invention can be used to optimize the operating of a hydrocarbon synthesis unit starting from synthesis gas (also known as Fischer-Tropsch synthesis) with a view to maximizing the yield of $C_5^+$ hydrocarbons (hydrocarbons containing 5 or more carbon atoms).

PRIOR ART

The Fischer-Tropsch synthesis reaction has been known since the beginning of the $20^{th}$ century. This synthesis principally produces alkanes, to a lesser extent alkenes and alcohols, with a very broad hydrocarbon chain length distribution (from $C_1$ to more than $C_{90}$). The major by-product is water, which has to be treated because of its hydrocarbons and oxygen-containing compound content. Units have been operated in Germany during the Second World War, then in South Africa in order to produce synthetic fuels.

Synthesis gas is generally produced from natural gas by autothermal reforming or steam reforming. Other sources may be used to produce synthesis gas, for example coal, petroleum coke, biomass or waste, alone or in suitable mixtures. Treatment of the synthesis gas is sometimes necessary on the one hand to adjust the $H_2$/CO ratio and on the other hand to eliminate compounds which are harmful to the Fischer-Tropsch synthesis and/or the catalyst, such as sulphur-containing compounds, chlorine-containing compounds, or metallic carbonyl compounds.

The catalysts used depend on the origin of the synthesis gas and/or on the desired products; their active phase contains iron or cobalt as well as metallic promoters which increase the selectivity and activity of the catalyst.

The Fischer-Tropsch synthesis, which has the characteristic of being extremely exothermic with reaction enthalpies of the order of −170 kJ/mol, can be used in a fixed bed or in a multi-tubular reactor as described in the work "Fischer-Tropsch technology" (A. P. Steynberg and M. E. Dry, 2004), or in a bubble column type reactor in which the finely divided catalyst is suspended in a liquid phase by movement of the gas phase from the bottom to the top of the reactor as described in patents U.S. Pat. No. 5,252,613, EP 0 820 806 and EP 0 823 470.

The term "slurry" is used for the medium constituted by the particles of catalyst in suspension in a liquid phase. Said particles of catalyst are very finely divided, typically with a mean dimension of the order of 5 microns to 700 microns, and thus are intimately linked to the liquid phase which contains them. The term "waxes" is applied to the portion of the slurry which is liquid under the operating conditions of the reaction section. A "slurry" reactor is a three-phase reactor containing a slurry, a stream of gas bubbles with a very broad spread of dimensions passing through said slurry.

The light products, which are in the vapour phase under the operating conditions of the reaction section, are separated in a gas/liquid separation section, while the heavier hydrocarbon compounds are separated from the catalyst in a wax/catalyst separation section. This section can be used to extract the waxes and recycle the catalyst to the reaction section in order to keep the catalyst volume stocked up in said section.

Separating waxes and catalyst is very important as it has to keep the vast majority of the catalyst in the reactor and extract the liquid product. Separation of this type may be carried out by two means:

separation by filtration, the filtration elements being disposed in the upper portion of the reactor. This filtration technology has been described in many texts, for example U.S. Pat. No. 5,527,473 or WO 10074761;

separation using an external loop for separating waxes such as that described, for example, in patents U.S. Pat. No. 5,770,629 or FR 2 802 828. U.S. Pat. No. 5,770,629 describes a Fischer-Tropsch synthesis using equipment allowing the filtration of slurry external to the reaction zone. That equipment comprises a filtration medium that can filter the liquid fraction. Said equipment can be used to separate a portion of the gas phase and solid from the slurry in order to increase the filtration efficiency and reduce clogging of said filter medium. Patent FR 2 802 828 describes a separation of the phases constituting the slurry in two steps, a first degassing step followed by a second step during which the waxes are separated from the catalyst, this latter being recycled to the reaction zone.

The cost of the catalyst in the Fischer-Tropsch process is a non-negligible fraction of the overall cost of the process (A. Brumby et al., Catal. Today, vol. 106 (2005), pp. 166-169). As a consequence, any improvement in the service life of a catalyst, which is a function of the stability of the catalyst, is of vital importance.

The stability of the Fischer-Tropsch catalyst depends both on its intrinsic properties (for example the characteristics of the support, the mode of preparation) and the conditions under which it is used. The conditions of the Fischer-Tropsch synthesis are known to be severe and can give rise to a partial pressure of water, $P_{H2O}$, which is fairly high; this high $P_{H2O}$ may then cause deactivation of the Fischer-Tropsch catalyst, in particular by oxidation of the metallic cobalt (active phase) when said catalyst is based on cobalt (P. J. van Berge et al., Catal. Today, vol. 58 (2000), pp. 321-334; A. M. Hilmen et al., Appl. Catal., vol. 186 (1999), pp. 169-188).

Thus, patent application US 2009/0176894 recommends a value for $P_{H2O}$ below 0.95 times the critical limit $P_{H2O\ limit}$ defined as follows:

$$P_{H2O\ limit}=\exp(-7751/d_p \cdot T) \cdot P_s(T)$$

where T is the reaction temperature in K, $d_p$ is the mean pore diameter of the catalyst in nm and $P_s(T)$ is the vapour pressure of the water in bar at the temperature T.

Patent FR 2 908 421 recommends keeping the ratio of the partial pressure of water to the partial pressure of hydrogen, $P_{H2O}$:$P_{H2}$, to a value strictly below 1.1. This ratio can be controlled by the following means: increasing the flow rate of the synthesis gas, increasing the recycle rate of the gases obtained from the gas/liquid separation section, adjusting the $P_{H2}$:$P_{CO}$ ratio, where $P_{CO}$ represents the partial pressure of carbon monoxide, reducing the temperature, or reducing the pressure. These latter two means have the disadvantage of having a negative impact on the production of the process.

However, none of those documents addresses the problem of controlling the operating conditions in the external loop for wax separation.

In addition, the risks of deactivation of the Fischer-Tropsch catalyst and the non-negligible cost fraction of the catalyst in carrying out the process have led the Applicant to seek to improve the performance of the catalyst, in particular by a reduction of the chemical stress on the catalyst caused by the presence of water during the gas/liquid/solid separation step and, as a consequence, a reduction in damaging of said catalyst under the conditions of said separation step.

AIM AND ADVANTAGE OF THE INVENTION

The present invention pertains to a Fischer-Tropsch synthesis process, said process comprising an external loop for separating waxes, characterized in that the $P_{H2O}:P_{H2}$ ratio in said loop is controlled by reducing the temperature in the degassing means.

The advantages of the present invention reside in the fact that by reducing the temperature in the external wax separation loop, the performance of the catalyst is stabilized, meaning that production of hydrocarbon products can be kept constant and makeup of catalyst over time can be reduced. The combination of these advantages means that the economics of the process can be improved. These advantages are surprising having regard to the teaching in patent FR 2 908 421, which teaches that reducing the temperature reduces the production of the process.

DETAILED DESCRIPTION OF THE INVENTION

The present invention concerns a process for the synthesis of hydrocarbons from a feed comprising synthesis gas, in which a solid catalyst comprising cobalt is used in a three-phase reaction section operated such that said catalyst is maintained in suspension in a liquid phase by movement of a gas phase from the bottom to the top of said reaction section, said process comprising an external loop for separating waxes, characterized in that:
1) the theoretical ratio $P_{H2O}:P_{H2}$ in the external loop for separating waxes is determined
2) if the theoretical ratio $P_{H2O}:P_{H2}$ determined in step 1) has a value of $R_{threshold}$ or higher, the temperature in the degassing means of the external loop for separating waxes is reduced,
3) steps 1) to 2) are repeated until the theoretical ratio $P_{H2O}:P_{H2}$ has a value strictly less than $R_{threshold}$, where $R_{threshold}$ is in the range 0.1 to 1.1.

Preferably, the synthesis gas used in the Fischer-Tropsch synthesis has a $H_2$:CO molar ratio in the range 1:2 to 5:1, more preferably in the range 1.2:2 to 3:1 and more preferably in the range 1.5:1 to 2.6:1.

Fischer-Tropsch synthesis is generally carried out at a pressure in the range 0.1 MPa to 15 MPa, preferably in the range 1 MPa to 10 MPa and more preferably in the range 1.5 MPa to 5 MPa. The hourly space velocity of the synthesis gas is generally in the range 100 to 20000 $h^{-1}$ (volume of synthesis gas per volume of catalyst per hour), preferably in the range 400 to 10000 $h^{-1}$.

Any catalyst comprising cobalt which is known to the skilled person may be suitable for the process of the invention. Preferably, catalysts are used which comprise cobalt deposited on a support selected from the following oxides: alumina, silica, zirconium, titanium oxide, magnesium oxide or mixtures thereof. Various promoters which are known to the skilled person may also be added, in particular those selected from the following elements: rhenium, ruthenium, molybdenum, tungsten, chromium. It is also possible to add at least one alkali or alkaline-earth to these catalytic formulations.

The ratio $P_{H2O}:P_{H2}$ theoretical in said external loop is determined from measurements of the molar flow rate of carbon monoxide, $CO_{inlet}$, and hydrogen, $H_{2\ inlet}$, entering said reaction section and measurements of the molar flow rate of carbon monoxide, $CO_{degas}$ and hydrogen, $H_{2\ degas}$, which leave the degassing means.

To this end, the conversion of carbon monoxide, Cv, the ratio $H_{2\ inlet}/CO_{inlet}$ of the feed, R1, and the usage ratio, Rft, are defined as follows:

$$Cv=(CO_{inlet}-CO_{degas})/CO_{inlet}$$

$$R1=H_{2\ inlet}/CO_{inlet}$$

$$Rft=(H_{2\ inlet}-H_{2\ degas})/(CO_{inlet}-CO_{degas})$$

The theoretical ratio $P_{H2O}:P_{H2}$ is then calculated as follows:

$$P_{H2O}:P_{H2}\ theoretical=Cv/(R1-Rft\times Cv)$$

Similarly, the theoretical ratio $P_{H2O}:P_{H2}$ in the reaction zone is determined using the measurements of the molar flow rate of carbon monoxide, $CO_{outlet}$, an at the and hydrogen, $H_{2\ outlet}$, at the outlet from said reaction section in place of $CO_{degas}$ and $H_{2\ degas}$.

The external wax separation loop is defined by at least one of the following steps:
a) removing a fraction of the reaction volume in the reaction section;
b) separating the fraction removed during step a) into a gas phase and a suspension containing the liquid and solid in a degassing means;
c) separating the suspension produced by step b) into a product comprising waxes and comprising at most 0.1% by volume of solid particles, and a suspension with a concentration of solid particles which is at least 5% higher than that of said suspension produced by said phase b);
d) recycling the suspension produced by step c) to the reaction section.

Removal in accordance with said step a) of a fraction of the reaction volume in the reaction section is operated under the same operating conditions as those for the reactor at the withdrawal point. As a consequence, the temperature, pressure and chemical composition of the withdrawn phase are identical to those of the reaction phase, which are adjusted to control, in particular to maintain, the ratio $P_{H2O}:P_{H2}$ theoretical at a value strictly less than 1.1 at any point of the reactor and thus to operate under optimized operating conditions for the Fischer-Tropsch catalyst so as not to degrade the productivity of the hydrocarbon compounds. Since the reaction volume which is removed comprises a fraction of the catalytic phase and the reagents, the Fischer-Tropsch reaction continues without control in the withdrawal tube.

Because of the highly exothermic nature of the synthesis reaction, the temperature of the fraction which is removed increases. The synthesis reaction consumes hydrogen and produces water, and so $P_{H2}$ reduces and $P_{H2O}$ increases. As a consequence, the ratio $P_{H2O}:P_{H2}$ increases beyond the optimized value, inducing risks of accelerated degradation of the catalyst.

As a consequence, it is necessary to control the theoretical ratio $P_{H2O}:P_{H2}$ in the external wax separation loop. In accordance with the invention, this ratio is controlled by carrying out step 3), namely repeating steps 1) to 2), until it is strictly below $R_{threshold}$.

In accordance with the invention, said step 2) is carried out by reducing the temperature in the means for degassing the external wax separation loop if the theoretical ratio $P_{H2O}:P_{H2}$ determined in step 1) has a value of more than or equal to $R_{threshold}$.

$R_{threshold}$ is in the range 0.1 to 1.1, preferably in the range 0.7 to 1.1. In a preferred embodiment, $R_{threshold}$ may take a value selected from 1.1, 0.9 and 0.7. In a preferred arrangement, $R_{threshold}$ is equal to 1.1. In another preferred arrangement, $R_{threshold}$ is equal to 0.9. In a variation, $R_{threshold}$ is equal to 0.7.

The reduction in temperature in the degassing means causes the conversion of CO in the external wax separation loop can be limited. The temperature of said degassing means is adjusted by keeping a predetermined temperature difference between the temperature of the reaction zone, $T_{rx}$, which is controlled, and that of said degassing means, $T_{degas}$.

The temperature of the degassing means is determined using any means known to the skilled person. It may be measured at several points in said degassing means, the set of measurements possibly being averaged.

Preferably, said temperature difference $T_{rx} - T_{degas}$ is in the range 0° C. to +30° C., more preferably in the range +4° C. to +15° C.

Said reduction in temperature may be carried out using any means known to the skilled person. As an example, the fraction removed during said step a) may pass through a heat exchanger to cool it. Another example is to include a heat removal means within the degassing means.

Figure 1:
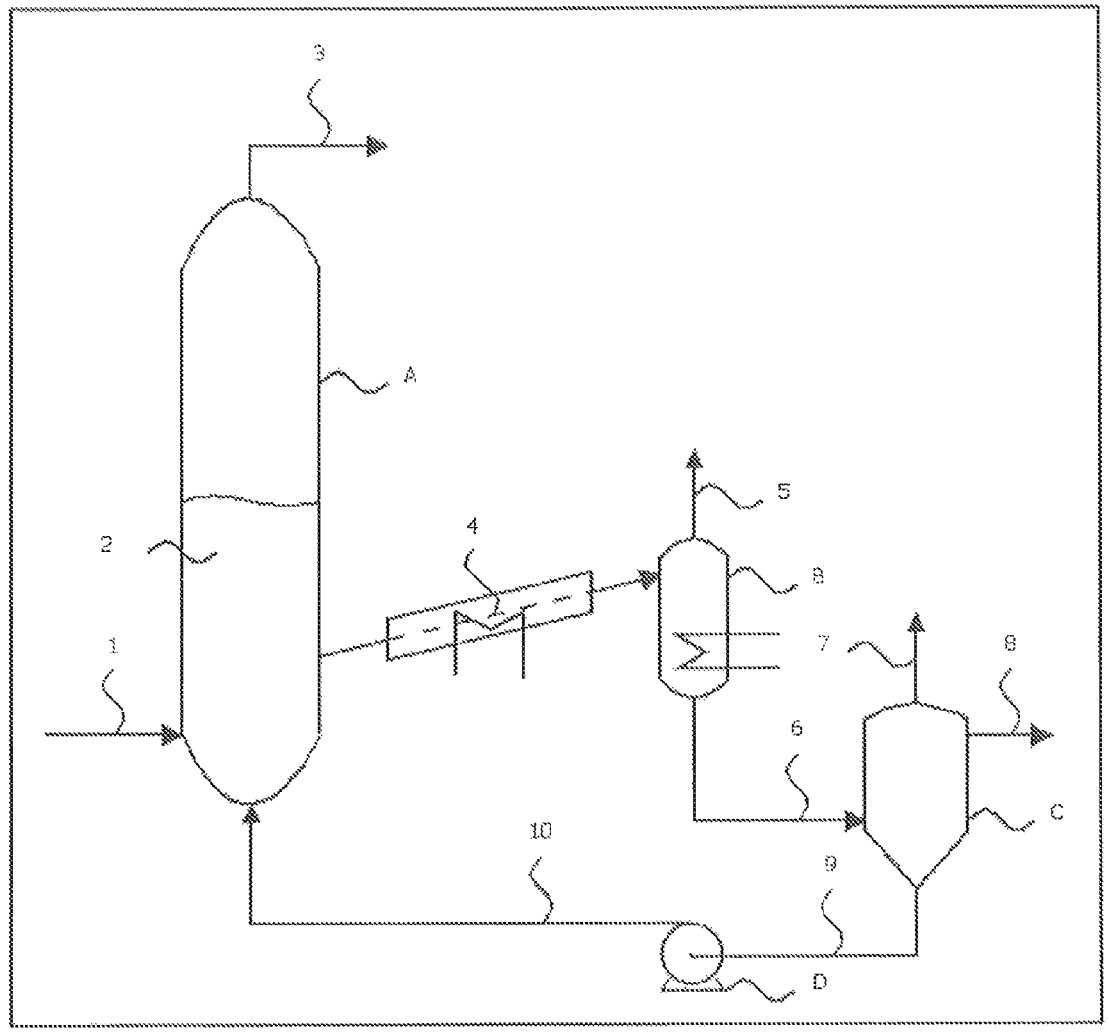
FIG. 1 illustrates an embodiment of the invention described.

The synthesis gas comprising carbon monoxide and hydrogen is sent via a line 1 to the lower portion of the Fischer-Tropsch reactor (A) of the slurry bubble column type partially filled with a hydrocarbon cut so as to maintain a Fischer-Tropsch catalyst in suspension, forming a slurry 2.

The catalyst is in the form of small particles with a diameter in the range 10 to 200 µm, which reduces transfer limitations. The slurry 2 is continuously mixed in order to form a homogeneous phase which can have an identical temperature at any point in said slurry, a low pressure drop over the reaction section, and to be able to continuously renew the catalyst stock by discharging catalyst contained in the reaction zone and charging with fresh catalyst.

The gas formed or which has not reacted during the reaction is separated in the disengagement zone located above the level of the liquid in the Fischer-Tropsch reactor (A), then leaves said reactor via the line 3.

A fraction of the reaction volume removed during said step a) is sent via the line 4 to a degassing drum (B) in order to separate, in accordance with said step b), on the one hand the gas which is sent via the line 5 and on the other hand the degassed suspension, which is sent to the settler (C) via the line 6.

The proportion of gas in said fraction of the reaction volume strictly depends on the operating conditions of the reactor (feed flow rate of synthesis gas, pressure, temperature) and the position of the extraction point for said fraction. Said gas is a mixture of light hydrocarbons produced by the Fischer-Tropsch reaction as well as unconverted synthesis gas.

The degassing drum (B) can be used to prevent the formation of turbulence in the settler (C) which could be caused by disengagement of the gas in the absence of the drum (B).

In accordance with said step c), settling in settler (C) provides waxes which are free of particles of catalyst via the line 8 withdrawn from the upper portion of the settler, an optional gas stream via the line 7 and a more concentrated suspension via the line 9 which, in accordance with said step d), is recycled to the Fischer-Tropsch reactor via the line 10 via a pumping means (D), so as to keep the concentration of catalyst in the reaction zone constant.

EXAMPLES

Example 1

Not in Accordance with the Invention

In this first example, the temperature of the fraction removed during step a) for the external wax separation loop is not controlled.

The mixture of synthesis gas and catalyst dispersed in the liquid phase is converted into liquid hydrocarbons in accordance with the Fischer-Tropsch synthesis reaction. In accordance with step a), the mixture of synthesis gas, catalyst and liquid is extracted from the external wax separation loop under the operating conditions for the reaction zone, in particular at a temperature of 229° C. This temperature means that the theoretical ratio $P_{H2O}:P_{H2}$ in the reaction zone can be kept to a value of less than 1.1.

At the point at which the reaction volume is removed, an analysis of the gas phase showed that approximately 17% of carbon monoxide contained in the feed had already been converted. The Fischer-Tropsch reaction was continued in the withdrawal line and in the degassing means, and so the conversion of CO reached 60% in the degassing means (conversion determined from an analysis of the gas phase in said means), causing an increase of 4° C. in the temperature, thus passing from 229° C. to 232° C. The theoretical ratio $P_{H2O}:P_{H2}$ in the external wax separation loop increased to reach a value of 1.6, which is greater than the limiting ratio of 1.1.

This high ratio caused a reduction in the catalytic performance over the operating period.

Figure 2:
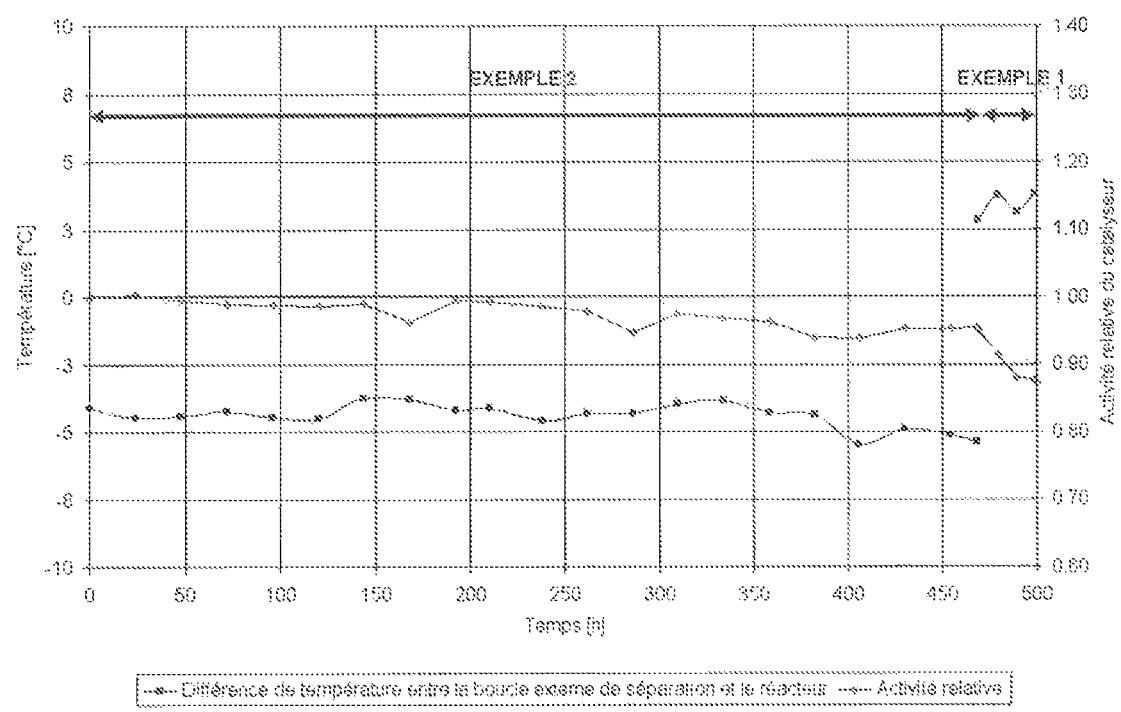
FIG. 2 illustrates that a high ratio caused a reduction in the catalytic performance over the operating period.

This effect can be seen in FIG. 2. After approximately 470 h, the temperature in the degassing means was no longer controlled. Thus, the reaction was no longer under control and the exothermic nature of the reaction thus caused an increase in the temperature, and as a consequence in the conversion of carbon monoxide and the ratio $P_{H2O}:P_{H2}$.

After stopping control of the temperature, the relative activity of the catalyst dropped from 0.96 to 0.88 in 30 h. The drop in activity of the catalyst caused a drop in the production of hydrocarbon products.

The carbon monoxide conversion, (CO), in the range 0 to 100%, is defined as:

$$X_{CO} = \frac{(Q_{m,CO,PtA} - Q_{m,CO,PtB})}{Q_{m,CO,PtA}}$$

with $X_{CO}$: carbon monoxide conversion $Q_{m,CO,PtA}$: mass flow rate of CO at point A, for example at inlet (1) to the reaction section $Q_{m,CO,PtB}$: mass flow rate of CO at point B, for example at outlet 5 from degassing means.

References 1 and 5 refer to FIG. 1.

Example 2

In Accordance with the Invention

In this second example, the temperature of the fraction removed during step a) for the external wax separation loop is kept at 225° C.

The mixture of synthesis gas and catalyst dispersed in the liquid phase is converted into liquid hydrocarbons in accordance with the Fischer-Tropsch synthesis reaction. In accordance with step a), the mixture of synthesis gas, catalyst and liquid is extracted from the external wax separation loop under the operating conditions for the reaction zone, in particular at a temperature of 229° C. This temperature means that the theoretical ratio $P_{H2O}:P_{H2}$ in the reaction zone can be kept to a value of less than 1.1.

In this example, the external wax separation loop was continuously cooled in order to maintain the degassing means at a temperature which was at least 5° C. lower with respect to the temperature of the reaction zone, allowing the theoretical ratio $P_{H2O}:P_{H2}$ to be kept to a value of 0.8, below the limit of 1.1.

At the reaction volume removal point, approximately 17% of the carbon monoxide contained in the feed had already been converted. With the temperature being controlled, the conversion was stabilized at approximately 50%.

By reducing the temperature in the external wax separation loop, the kinetics of the reaction were limited.

Under these conditions, the performance of the catalyst was stable, meaning that a constant flow rate for the production of hydrocarbon products could be maintained.

This is illustrated in FIG. 2, between 0 and approximately 470 h. The temperature of the external wax separation loop was maintained at approximately 5° C. below the temperature of the reactor. The activity of the catalyst was stable during this period.

The invention claimed is:

1. A process for the synthesis of hydrocarbons from a feed comprising synthesis gas, in which a solid catalyst comprising cobalt is present in a three-phase reaction section operated such that said catalyst is maintained in suspension in a liquid phase by movement of a gas phase from the bottom to the top of said reaction section, said process comprising separating waxes in an external loop having a degassing means, wherein 1) a theoretical ratio $P_{H2O}:P_{H2}$ in the external loop for separating waxes is determined by the following calculation:

$$P_{H2O}:P_{H2} \text{ theoretical}=Cv/(R1-Rft \times Cv)$$

where $Cv=(CO_{inlet}-CO_{degas})/CO_{inlet}$
$R1=H_{2\ inlet}/CO_{inlet}$
$Rft=(H_{2\ inlet}-H_{2\ degas})/(CO_{inlet}-CO_{degas})$ wherein $CO_{inlet}$ is a measurement of the molar flow rate of carbon monoxide entering the reaction section, $CO_{degas}$ is a measurement of the molar flow rate of carbon monoxide leaving the degassing means, $H_{2\ inlet}$ is a measurement of the molar flow rate of hydrogen entering the reaction section, $H_{2\ degas}$ is a measurement of the molar flow rate of carbon monoxide leaving the degassing means, 2) if the theoretical ratio $P_{H2O}:P_{H2}$ determined in step 1) has a value of $R_{threshold}$ or higher, the temperature in the degassing means of the external loop for separating waxes is reduced, 3) steps 1) and 2) are repeated until the theoretical ratio $P_{H2O}:P_{H2}$ has a value strictly less than $R_{threshold}$, where $R_{threshold}$ is a value in the range 0.1 to 1.1.

2. The process according to claim 1, in which $R_{threshold}$ is equal to 1.1.

3. The process according to claim 1, in which $R_{threshold}$ is equal to 0.9.

4. The process according to claim 1, in which $R_{threshold}$ is equal to 0.7.

5. The process according to claim 1, in which step 2) is carried out by reducing the temperature in said degassing means such that the difference in temperature between the reaction section and the degassing mean is in the range of 0° C. to +30° C.

6. The process according to claim 5, in which the difference in temperature between the reaction section and said degassing means is in the range of +4° C. to +15° C.

7. The process according to claim 1, in which the reduction in the temperature of step 2) is performed by a heat exchanger.

8. A process for the synthesis of hydrocarbons from a feed comprising synthesis gas, in which a solid catalyst comprising cobalt is present in a three-phase reaction section operated such that said catalyst is maintained in suspension in a liquid phase by movement of a gas phase from the bottom to the top of said reaction section, said process comprising separating waxes in an external loop having a degassing drum, wherein 1) a theoretical ratio $P_{H2O}:P_{H2}$ in the external loop for separating waxes is determined by the following calculation:

$$P_{H2O}:P_{H2} \text{ theoretical}=Cv/(R1-Rft \times Cv)$$

where $Cv=(CO_{inlet}-CO_{degas})/CO_{inlet}$
$R1=H_{2\ inlet}/CO_{inlet}$
$Rft=(H_{2\ inlet}-H_{2\ degas})/(CO_{inlet}-CO_{degas})$ wherein $CO_{inlet}$ is a measurement of the molar flow rate of carbon monoxide entering the reaction section, $CO_{degas}$ is a measurement of the molar flow rate of carbon monoxide leaving the degassing drum, $H_{2\ inlet}$ is a measurement of the molar flow rate of hydrogen entering the reaction section, $H_{2\ degas}$ is a measurement of the molar flow rate of carbon monoxide leaving the degassing drum, 2) if the theoretical ratio $P_{H2O}:P_{H2}$ determined in step 1) has a value of $R_{threshold}$ or higher, the temperature in the degassing drum of the external loop for separating waxes is reduced, 3) steps 1) and 2) are repeated until the theoretical ratio $P_{H2O}:P_{H2}$ has a value strictly less than $R_{threshold}$, where $R_{threshold}$ is a value in the range 0.1 to 1.1.

9. The process according to claim 8, in which $R_{threshold}$ is equal to 1.1.

10. The process according to claim 8, in which $R_{threshold}$ is equal to 0.9.

11. The process according to claim 8, in which $R_{threshold}$ is equal to 0.7.

12. The process according to claim 8, in which step 2) is carried out by reducing the temperature in said degassing drum such that the difference in temperature between the reaction section and the degassing drum is in the range of 0° C. to +30° C.

13. The process according to claim 12, in which the difference in temperature between the reaction section and said degassing drum is in the range of +4° C. to +15° C.

14. The process according to claim 8, in which the reduction in the temperature of step 2) is performed by a heat exchanger.

* * * * *